United States Patent [19]

Van Kampen

[11] Patent Number: 4,791,752
[45] Date of Patent: Dec. 20, 1988

[54] FISHING TACKLE STORING SPINDLE

[76] Inventor: Timothy J. Van Kampen, 1551 Birmingham St., St. Paul, Minn. 55106

[21] Appl. No.: 87,871

[22] Filed: Aug. 21, 1987

[51] Int. Cl.⁴ .......................................... A01K 97/00
[52] U.S. Cl. ..................................... 43/54.1; 43/57.1; 43/57.2; 242/106; 242/129.6
[58] Field of Search ...................... 43/54.1, 57.1, 57.2; 248/215; 206/315.4; 242/106, 129.6, 55.2

[56] References Cited

U.S. PATENT DOCUMENTS

| | | | |
|---|---|---|---|
| 2,665,517 | 1/1954 | Archer | 43/57.1 |
| 2,716,302 | 8/1955 | Dutton | 43/57.1 |
| 2,789,389 | 4/1957 | Moen | 43/57.2 |
| 2,879,619 | 3/1959 | Peterson | 43/57.2 |
| 2,913,850 | 11/1959 | George | 43/57.1 |
| 3,032,914 | 5/1962 | Valle | 43/57.2 |
| 3,279,720 | 10/1966 | Garrett | 242/129.6 |
| 3,962,815 | 6/1976 | Christensen | 43/54.1 |
| 4,555,862 | 12/1985 | Panasewich | 43/57.1 |
| 4,708,244 | 11/1987 | Fish et al. | 43/54.1 |

FOREIGN PATENT DOCUMENTS 26889  11/1909  United Kingdom ............ 242/129.6

Primary Examiner—Nicholas P. Godici
Assistant Examiner—Richard K. Seidel
Attorney, Agent, or Firm—Burd, Bartz & Gutenkauf

[57] ABSTRACT

A spindle for accommodating fishing tackle has an elongated cylindrical member rotatably mounted on a pair of double-hooked brackets. Each bracket has a downwardly open clip adapted to be mounted on a tray of a fishing tackle box. The lower end of each bracket has an upwardly open hook rotatably accommodating axles secured to the spindle. A crank secured to one axle is used to manually rotate the spindle. The spindle has an outer cylindrical surface having grooves for accommodating fishing tackle and leaders. Outwardly directed hooks located adjacent the grooves are used to anchor the fishing tackle to facilitate the winding of the tackle on the spindle. Fish hooks attached to leaders are embedded into the spindle to retain the leaders around the spindle.

20 Claims, 3 Drawing Sheets

FISHING TACKLE STORING SPINDLE

FIELD OF INVENTION

The invention relates to an apparatus for storing lines, such as fishing lines, leaders and hooks attached thereto in a conventional fishing tackle box or on the side of a boat.

BACKGROUND OF INVENTION

In the past, various structures have been used to hold fish lines and leaders. Devices for holding and storing fish lines and leaders are disclosed in U.S. Pat. Nos. 2,665,517 to Archer and 3,032,914 to Valle. These devices have holders for storing leaders and fish lines within a tackle box or on the side of a boat.

Prior holding devices for storing fish leaders and lines have some disadvantages. One major problem is that the leaders and lines often become twisted and tangled. When attempting to remove a fishing rig for use, other lines and leaders may interfere. Separating the fishing rigs can be time consuming and frustrating. Anglers are unprotected from becoming snagged by a loose hook. Also, hook points lose their sharpness when not confined. Another common difficulty is adapting the tackle box or fishing boat to be able to accommodate the line holder. Often the tackle box has to be altered to fit the line holder inside the box. Similarly, the line holder is not readily attachable and detachable from the side of a boat.

SUMMARY OF THE INVENTION

The invention is directed to a spindle and bracket assembly for holding and storing fish lines and leaders with hooks attached thereto, such as Lindy Rigs, Little Joes, and floating heads. The spindle and bracket assembly of the invention has a rotatable spindle mounted on brackets that can be readily attached to the lower tray of a fishing tackle box. Other types of brackets and mounts can be used to hold the spindle in a desired location on a support.

One form of the spindle for fishing tackle comprises an elongated cylindrical member rotatably mounted on a pair of double-hooked brackets. Each bracket has a downwardly open clip and upwardly open lower hook. The spindle has a series of circumferential grooves around its outer surface to accommodate fish lines and leaders. A pair of axles project outwardly from opposite ends of the cylindrical member. The axles are supported in the lower hooks of the brackets. A crank joined to one axle is used to manually rotate the spindle. The upper clips of the brackets can be slipped over the side of the lower tray of a fishing tackle box to mount the spindle on the tray.

The cylindrical member has an inner cylindrical core that is covered with a tubular member or tube of soft material, such as rubber or foam plastic. The tube is positioned with a tight fit around the cylindrical core so that the core and tube turn together to accommodate fishing lines, hooks, lures, flies, leaders, and rigs. Fish hooks can be embedded in the tube without dulling the hook point. The tube has a longitudinal slit along one side for easy application and removal from the cylindrical core. A plurality of hooks extend from the core of the spindle through the slit in the tubular member to prevent rotation of the tube around the core. The hooks also anchor the eyes of the fish lines and leaders to facilitate the winding of the line on the spindle.

In another form of the spindle and bracket assembly, the spindle can be a one-piece cylindrical member having laterally spaced circumferential grooves in the outer peripheral surface of the member. The cylindrical member can be a metal, wood or plastic rod. The rod can be coated with a material, such as flexible plastic or rubber. The point of a fish hook can be inserted into this material Pins joined to the ends of the cylindrical member serve as axles to rotate the cylindrical member on support brackets. A crank joined to one axle is used to manually rotate the spindle.

The spindle can be placed on brackets secured to the side of a boat. A first L-shaped bracket has a centrally located hole to accommodate the first axle of the spindle. A second L-shaped bracket has an upwardly directed slot to receive the second spindle axle. Extending joined to the second axle is a crank. The crank is used to rotate the spindle. To mount the spindle on the boat, the first axle is inserted into the hole of the first bracket and, then, the second axle is placed into the slot of the second bracket.

The spindle is an elongated cylindrical member that can hold a number of different fish lines, leaders, hooks, and fishing rigs. This avoids tangling and twisting of the lines and leaders. The spindle and brackets are relatively low cost structures that are easy to assembly and use. The spindle can be removed from the brackets and replaced with another spindle with different fishing tackle. The brackets are mountable on conventional trays used in fishing tackle boxes without altering the trays or tackle boxes. When the tackle box is closed the spindle is located inside the box and does not interfere with tackle in the box.

These objects and other advantages of the spindle for accommodating fish line, lures, hooks, flies, leaders and the like are embodied in the spindle and brackets shown in the drawing and described in the following description thereof.

DESCRIPTION OF PREFERRED EMBODIMENTS

Figure 1:
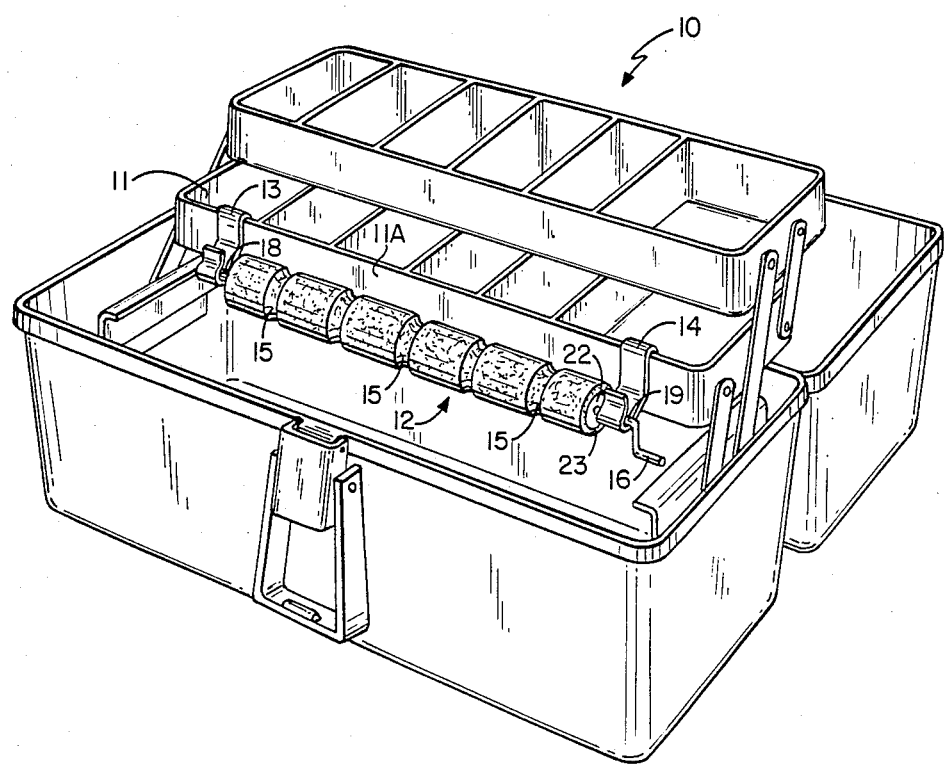
FIG. 1 is a perspective view of an open fishing tackle box equipped with the spindle and bracket assembly for holding fish lines of the invention.
Figure 2:
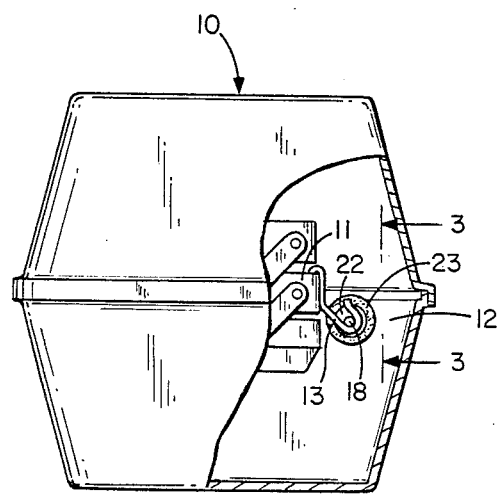
FIG. 2 is an end view of a closed fishing tackle box with an end broken way to show the location of the spindle and bracket assembly therein.

Referring to FIGS. 1 and 2, there is shown a conventional tackle box indicated generally at 10 having the usual bottom case, cover, and trays for storing fish lures, rigs, weights, hooks, sinkers, and like fishing tackle. Tackle box 10 has a pair of trays that are pivotally carried on arms that hold the trays in their open positions as shown in FIG. 1. Lower tray 11 has a front wall 11A that is spaced inwardly from the front wall of the tackle box. The spindle and bracket assembly of the invention is mounted on front wall 11A of tray 11 where it is readily assessible by the fisherperson when the tray 11 is in its up or open position. As shown in FIG. 2, when the trays are in their closed nested position, the spindle and bracket assembly is within the tackle box chamber below the side of tray 11. Spindle 12 is located in space within the tackle box that is not normally used in a tackle box. Tackle box 10 is conventional single cover box having a pair of trays. Tackle boxes having a single tray or a plurality of trays can be used with the line accommodating spindle and bracket assembly of the invention. For example, a conventional tackle box having a pair of covers pivoted to opposite sides of a bottom case and three trays on each side of the box adjacent the covers can be used with the spindle and bracket assembly as herein described.

The spindle and bracket assembly comprises an elongated generally cylindrical spindle indicated generally at 12 rotatably mounted on a pair of brackets 13 and 14. The brackets 13 and 14 are hooked unto the opposite ends of front wall 11A of tray 11 to locate spindle 22 generally parallel to front wall 11A of tray 11.

Figure 3:
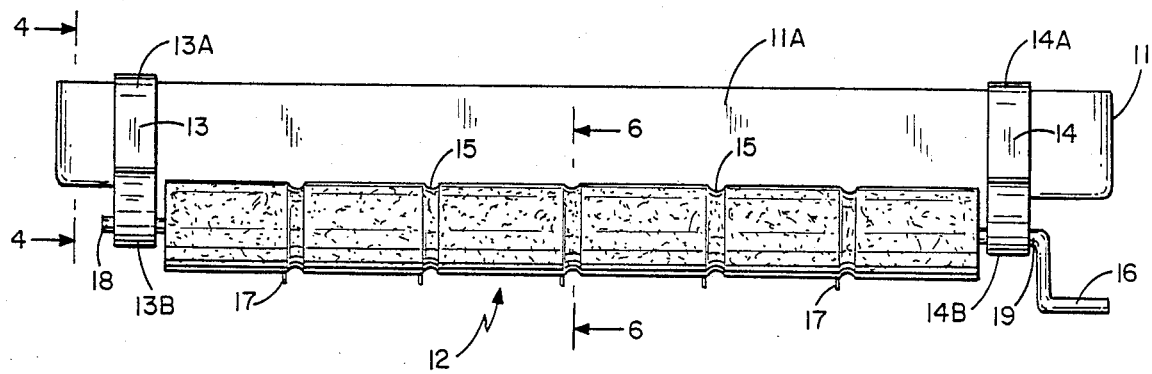
FIG. 3 is an enlarged sectional view taken along the line 3—3 of FIG. 2 of the spindle and bracket assembly.
Figure 4:
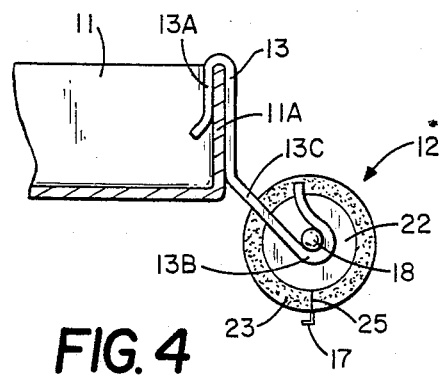
FIG. 4 is a sectional view taken along the line 4—4 of FIG. 3.
Figure 5:
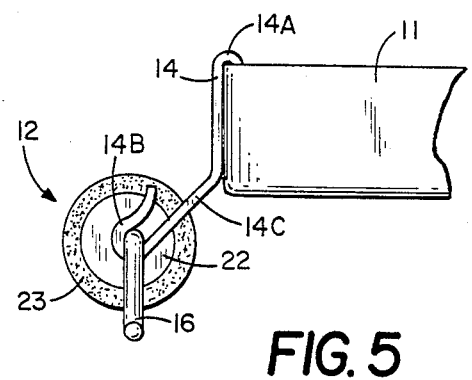
FIG. 5 is a foreshortened end view of the right end of FIG. 3.
Figure 6:
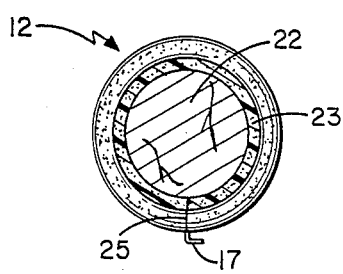
FIG. 6 is an enlarged sectional view taken along the line 6—6 of FIG. 3.

As shown in FIG. 4, bracket 13 is a generally inverted S-shaped body having a downwardly open top clip 13A and an upwardly open bottom hook 13B. Clip 13A fits over or clamps onto front wall 11A of tray 11. The body of bracket 13 includes a downwardly and rearwardly projected bottom section or arm 13C that is joined to hook 13B. Referring to FIG. 5, bracket 14 has a downwardly open clip 14A that fits over or clamps to the front wall 11A of the tray 11. The lower end of bracket 14 has an upwardly open hook 14B. A downwardly and outwardly extended lower portion or arm 14C extends away from the lower portion of tray 11. As shown in FIG. 3, brackets 13 and 14 locate spindle 12 outwardly and below the top edge of the front wall 11A of tray 11. Outwardly directed axles or pins 18 and 19 are joined to the opposite ends of spindle 12. A crank 16 is joined to axle 19 whereby spindle 12 can be manually rotated about its longitudinal axis. A knob can be used in lieu of crank 16 to rotate spindle 12. The axle 19 is located in the mouth of hook 13B of bracket 13. In a similar manner, the axle 19 is located in the mouth of hook 14B of bracket 14. The hooks 13B and 14B have upwardly directed generally arcuate ends that facilitate the placement of axles 18 and 19 in the mouths of the hooks. Spindle 12, along with axles 18 and 19 and crank 16, can be remove from hooks 13B and 14B to facilitate the placement of a new spindle on the brackets 13 and 14 without the use of tools or disassembling any parts. Different types of fishing tackle can be wound on the new spindle so that the fisherperson can change types of tackle without unwinding the tackle on the spindle.

Figure 7:
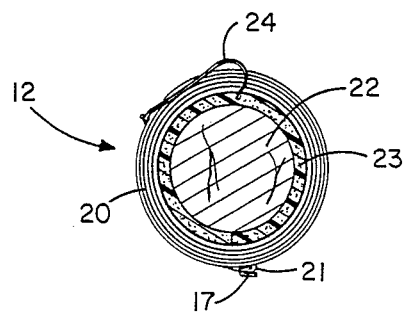
FIG. 7 is a sectional view similar to FIG. 6 with a spindle holding a hook and leader.

Spindle 12 has a plurality of circumferential grooves 15 surrounding its outer peripheral surface. As shown in FIG. 3, the grooves are outwardly open and longitudinally spaced from each other along the length of the spindle 12 to provide circumferential channels for accommodating fish line and the like. FIG. 7 shows fish leader 20 and hook 24 located about spindle 12 with the line of the leader in a groove 15.

A plurality of outwardly directed right angle fingers or hooks 17 are secured to the spindle 12. A finger 17 is located adjacent each groove 15 to accommodate an eye 21 of the fish leader. The fingers 17 serve as anchors for the fish line during winding on the line on spindle 12.

Shown in FIGS. 4 to 7, spindle 12 has a central elongated cylindrical core 22 of rigid material, such as wood, plastic, or the like. The core 22 is surrounded with a tubular member or tube 23 of pliable resilient material, such as rubber, foam plastic, plastic, and the like. The tube 23 can, for example, be made of a closed cell polyurethane foam. The foam tube 23 will float on water in the event that the spindle is dropped into the water. The tube 23 has a longitudinal slit 25 to facilitate the placement and removal of tube 23 from core 22. Tube 23 is clamped about core 22 and is located in the generally tight frictional relationship relative to the outside surface of core 22 to minimize the separation and slipping of tube 23 on core 22. Core 22 can be coated with material, such as rubber or plastic, that accommodates the point of a fish hook. The fish hook 24 secured to the line 20 has a pointed end that is embedded into the material of tube 23 to hold line 20 around spindle 12. This protects the sharp point of the hook 24 and minimizes the cutting and nicking of the fisherperson's fingers with hook 24. Line 20 being wrapped around spindle 23 and located in groove 15 therein does not become tangled and twisted with other lines and is readily accessible for use by the fisherperson.

Brackets 13 and 14 can be one-piece metal or plastic members that are adapted to be placed on trays of a variety of types of fishing tackle boxes. Clips 13A and 14A can also be mounted on other structures to place spindle 12 in a convenient location for the fisherperson. Tube 23 can be readily removed from core 22 by separating the opposite halves of tube 23 and pulling tube 23 from core 22. A new tube can then be placed about core 22.

The entire spindle 12 can be a one-piece wood or plastic member provided with a plurality of circumferential grooves longitudinally spaced along the length thereof. The grooves have a depth to accommodate several turns of fish line and store the hooks and lures attached to the line.

Figure 8:
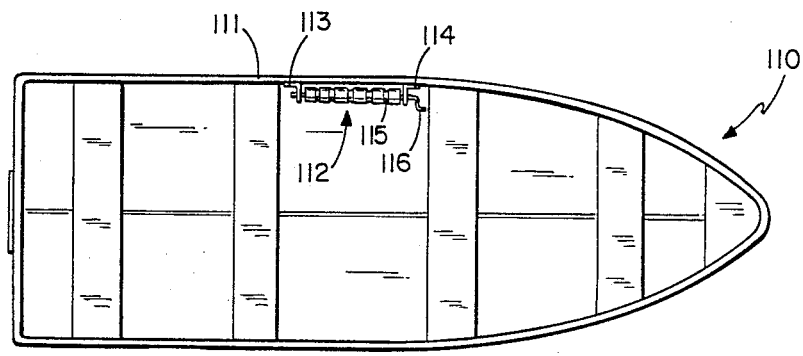
FIG. 8 is a plan view of a fishing boat equipped with the spindle and bracket assembly of the invention.
Figure 9:
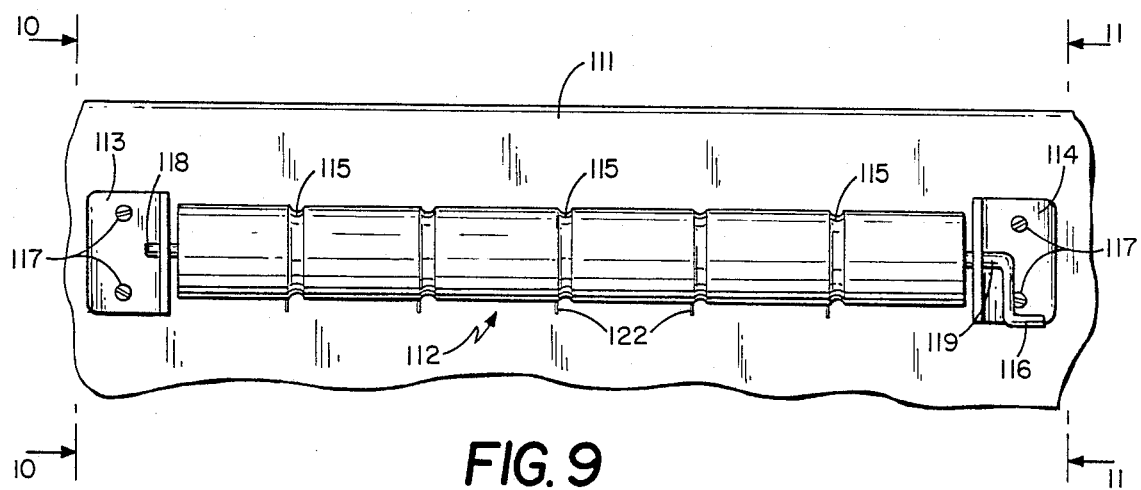
FIG. 9 is an enlarged side view of the spindle and bracket assembly of FIG. 8.
Figure 10:
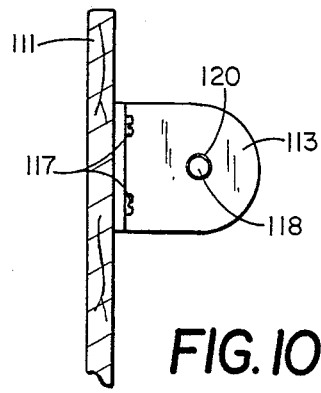
FIG. 10 is a sectional view taken along the line 10—10 of FIG. 9.
Figure 11:
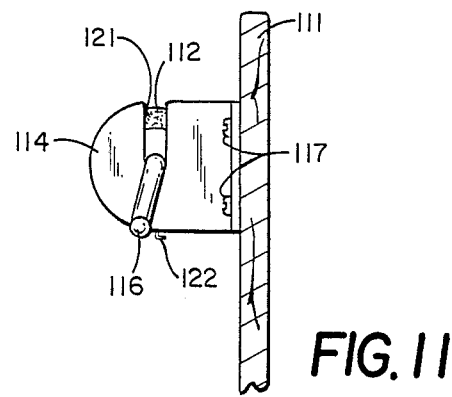
FIG. 11 is a sectional view taken along the line 11—11 of FIG. 9.

A second embodiment of the spindle indicated generally at 112 for fishing tackle is shown in FIGS. 8 to 11. A conventional fishing boat 110 has the inside wall 111. An elongated cylindrical spindle 112 is mounted on the side wall 111 with a pair of right angled brackets 113 and 114. As shown in FIGS. 9 to 11, brackets 113 and 114 have a generally L-shape and bear against the inside of the wall 111 of the boat. A plurality of screws 117 are used to secure the brackets to side wall 112. Other types of fastening means, such as adhesives, rivets, and the like can be used to mount the brackets 113 and 114 on side wall 111. Alternatively, the brackets can be mounted on a separate support that is held on side wall 111. Outwardly directed longitudinal axles 118 and 119 are secured to opposite ends of spindle 112. Axles 118 and 119 are rotatably mounted on brackets 113 and 114 to allow the spindle to rotate about its longitudinal axis. Axle 119 has a crank 116 which can be used by a fisherperson to rotate spindle 112 and wind fish line and like tackle thereon.

Bracket 113 has a hole 120 to accommodate axle 118. Bracket 114 has an upwardly directed slot 121 that receives the axle 119. Spindle 112 is mounted on brackets 113 and 114 by placing axle 118 through hole 120. Axle 119 is then aligned with and dropped down into the slot 121 thereby rotatably mounting spindle 112 on brackets 113 and 114.

Referring to FIGS. 8 and 9, spindle 112 has a plurality of circumferential grooves 115 open to its outer peripheral surface for accommodating fish line, leaders, tackle, and the like. Spindle 112 supports a plurality of radially extended right angled fingers or hooks 122 that serve as anchors for accommodating the eyes of the fish line to facilitate the holding and wrapping of the fish lines on spindle 112. The fisherperson utilizes the crank 116 to rotate spindle 112 about axles 118 and 119. Fingers 122 serve as anchors for the fish line so that the fish line is continuously wound into grooves 115 of spindle 112. The hook on each fishing line is then inserted into the spindle 112 to retain the line on the spindle. The fisherperson merely releases the hook and pulls the line from the spindle so it can be readily and conveniently attached to the line on the fisherperson's rod.

While there has been shown and described preferred embodiments of the spindle and brackets for rotatably mounting the spindle on a support such as a tackle box and boat it is understood that the changes in the uses, structure, materials, sizes, shapes, and supporting structures for the spindle and brackets can be made by those skilled in the art without departing from the invention. The invention is defined in the following claims.

I claim:

1. A fishing tackle storing apparatus comprising: a fishing tackle box, one or more trays for accommodating fishing tackle, means mounting the trays on the box for selected movement between an up position and a down position within the box, a rotatable spindle located adjacent one of said trays, said spindle including an elongated cylindrical member upon which fish line and leaders can be wrapped, bracket means mounting said spindle on one of said trays said bracket means having arm means extended downwardly and outwardly from said one of the trays to locate the spindle adjacent and at a level lower than said one of the trays thereby allowing the spindle to be located within the body when the trays are in the down position, said spindle having means rotatably mounted on the bracket means whereby the spindle is rotatable about its longitudinal axis so that fish line can be wrapped about said spindle and located within said tackle box adjacent said one of the trays.

2. The apparatus of claim 1 including: a plurality of hooks connected to said spindle adapted to hold fish line whereby rotation of said spindle will wrap the fish line about said spindle.

3. The apparatus of claim 1 including: crank means connected to said spindle usable to manually rotate said spindle.

4. The apparatus of claim 1 wherein: the means rotatably mounting the spindle on the bracket means includes a pair of axles extended from opposite ends of the spindle, said axles being rotatably mounted on said bracket means, and crank means connected to one of said axles useable to manually rotate said spindle.

5. The apparatus of claim 1 wherein: said spindle has an outer cylindrical surface, said surface having a plurality of outwardly open circumferential grooves to accommodate the fish line.

6. The apparatus of claim 1 wherein: said bracket means comprise a plurality of brackets, each bracket having a downwardly open clip and an upwardly open hook, said means for rotatably mounting the spindle on said bracket means includes axles located in said hooks, said downwardly open clips being mounted on said one tray.

7. The apparatus of claim 1 wherein: said spindle has an elongated cylindrical core, and cover means surrounding said core, said fish line being wound on said cover means.

8. The apparatus of claim 7 wherein: said cover means comprises a tube located about said core, said tube having a longitudinal slit, and a plurality of hooks mounted on the core and extended through the longitudinal slit to accommodate fish line to facilitate the wrapping of the fish line about the tube.

9. The apparatus of claim 8 wherein: the tube is a closed cell polyurethane foam tube.

10. The apparatus of claim 7 wherein: said means rotatably mounting the spindle on the bracket means comprises a pair of axles joined to opposite ends of said core, said axles being rotatably mounted on said bracket means thereby rotatably mounting the spindle on said bracket means.

11. The apparatus of claim 10 including: crank means attached to one of said axles, said crank means being useable to manually rotate said spindle.

12. A fishing tackle holding apparatus including a fishing tackle box having at least one tray movable between an up position and a down position within the box comprising: an elongated spindle having opposite ends, bracket means for mounting the spindle outwardly and at a level lower than a tray of the tackle box whereby when the tray is in the down position the spindle is located within the box, axle means extending from the opposite ends of the spindle rotatably mounted on said bracket means whereby said spindle is rotatably mounted on said bracket means, and means to receive and hold at least one fish line on the spindle.

13. The apparatus of claim 12 wherein: the cylindrical spindle has an inner core and an outer cover means surrounding said core, said cover means having at least one circumferential groove to accommodate said at least one fish line.

14. The apparatus of claim 13 wherein: said cover means comprises a tube located about said core, said tube having a longitudinal slit, and a plurality of hooks mounted on the core and extended through the longitudinal slit to accommodate fish line to facilitate the wrapping of the fish line about the tube.

15. The apparatus of claim 14 wherein: the tube is a closed cell polyurethane foam tube.

16. The apparatus of claim 12 including: crank means attached to one of said axle means, said crank means being useable to manually rotate said spindle.

17. The apparatus of claim 12 including: a plurality of hooks connected to said spindle adapted to hold fish line whereby rotation of said spindle will wrap the fish line about said spindle.

18. The apparatus of claim 17 including: crank means connected to said axle means useable to manually rotate said spindle.

19. The apparatus of claim 12 wherein: said spindle has an outer cylindrical surface, said surface having a plurality of outwardly open circumferential grooves to accommodate the fish line.

20. The apparatus of claim 12 wherein: said bracket means comprise a plurality of brackets, each bracket having a downwardly open clip, a downwardly and outwardly extended lower arm, and an upwardly open hook attached to the arm, said axle means for rotatably mounting the spindle on said bracket means being located in said hooks, said downwardly open clips being mounted on said tray.

* * * * *